United States Patent

Yamamoto et al.

[11] Patent Number: 5,959,786
[45] Date of Patent: Sep. 28, 1999

[54] OPTICAL APPARATUS WITH POWER TRANSMISSION MECHANISM

[75] Inventors: Haruhisa Yamamoto, Fujisawa; Takeshi Idemura, Utsunomiya, both of Japan

[73] Assignee: Canon Kabushiki Kaisha, Tokyo, Japan

[21] Appl. No.: 09/040,779

[22] Filed: Mar. 18, 1998

[30] Foreign Application Priority Data

Mar. 26, 1997 [JP] Japan ..................................... 9-091425
May 15, 1997 [JP] Japan ..................................... 9-143217

[51] Int. Cl.$^6$ .............................. G02B 15/14; G02B 7/02
[52] U.S. Cl. .......................... 359/694; 359/696; 359/699; 359/822
[58] Field of Search ..................... 359/694–696, 359/699–701, 822–823

[56] References Cited

U.S. PATENT DOCUMENTS 5,715,101  2/1998  Nakamura et al. ..................... 359/823

*Primary Examiner*—Georgia Epps
*Assistant Examiner*—Michael A Lucas
*Attorney, Agent, or Firm*—Robin, Blecker & Daley

[57] ABSTRACT

An optical apparatus includes an optical unit, a manual operation ring for manually driving the optical unit, a driving motor for electrically driving the manual operation ring, a transmission driving force limiting member for liniting a transmission driving force between the manual operation ring and the driving motor, the transmission driving force limiting member being formed in a ring shape substantially cocentric with an optical axis of the optical unit, a speed reduction gear for transmitting a driving force from the driving motor to the transmission driving force limiting member, wherein the following condition is satisfied:

$$TL < TF < TM$$

where TL is a torque required for driving the manual operation ring, which is disposed on the side of the optical unit relative to the transmission driving force limiting member, and the optical unit, TF is a limit torque transmissible by the transmission driving force limiting member, and TM is a limit torque with which a driving system composed of the driving motor and the speed reduction gear can be kept stopped against driving from an output side of the driving ststem. Accordingly, the optical unit can be driven either with the driving motor or by a manual operation on the manual operation ring without recourse to any switch-over mechanism.

7 Claims, 7 Drawing Sheets

OPTICAL APPARATUS WITH POWER TRANSMISSION MECHANISM

BACKGROUND OF THE INVENTION

1. Field of the Invention

The present invention relates to an optical apparatus having a power transmission mechanism advantageously arranged for moving optical means such as a photo-taking lens to be used for television shooting or the like.

2. Description of Related Art

An optical apparatus such as a photo-taking lens for television shooting or the like has been arranged to drive predetermined optical means with a driving force for zooming, focusing, adjustment of an iris, insertion and removal of a filter, etc.

In the case of a photo-taking lens adapted for television shooting, for example, a lens unit thereof is generally arranged to be driven by rotating an operation ring which is disposed on the outside of the lens unit in a state of being directly linked to the lens unit. The operation ring is arranged to be operated by the hand of a camera operator or driven by an electric motor responsive to the camera operator, according to shooting conditions. A drive unit which is provided for electrically driving the operation ring is disposed at a part of a lens barrel.

The drive unit includes various switches and a power transmission mechanism which is linked to the operation ring of the lens barrel. When some of the switches is operated by the camera operator, the electric motor is actuated to move the operation ring through the power transmission mechanism. When the lens unit is to be manually moved, the camera operator either rotates the operation ring directly by the hand or operates a lever provided on the operation ring to rotate the operation ring.

The operation ring of the photo-taking lens is thus arranged to be drivable either by hand or by an electric motor. Therefore, the power transmission mechanism included in the drive unit is thus arranged to be operated selectively in one of the two operation modes.

FIG. 4 shows the appearance of the conventional photo-taking lens. The photo-taking lens is composed of a lens body 1, a drive unit 2, a focus ring 3, a zoom ring 4 and an iris ring 5. FIG. 5 shows a television camera on which the above-stated photo-taking lens is mounted.

FIG. 6 shows a power transmission path obtained when a predetermined lens unit is to be driven by an electric motor 10 disposed within the drive unit 2. All elements other than a lens barrel and an operation ring 11 are disposed within the drive unit 2. An intermeshing toothed part 11a is formed on the outside of the operation ring 11 around the circumference thereof. A variable speed gear 12 is provided integrally with the electric motor 10. A sleeve 14 is secured to the output shaft 13 of the variable speed gear 12 with a pin 15. An output gear 16 of the variable speed gear 12 is mounted in such a way as to be rotatable with respect to the sleeve 14. A spring 18 is arranged to push the output gear 16 toward the sleeve 14 through a sliding washer 17.

Under a prescribed load torque, the output gear 16 and the output shaft 13 rotate together. However, when the load torque becomes excessive, the sleeve 14 comes to serve as a torque limiter by slipping relative to the output gear 16 so that a force acting on a tooth face can be mitigated to prevent teeth from being damaged. This torque limiter mechanism gives an advantageous effect by absorbing an impact on the tooth face particularly when the lens unit comes to a stop upon arrival at an end of its action caused by high-speed driving.

An intermediate gear 19 is arranged between the output gear 16 and the operation ring 11 to be rotatable relative to a shaft 20 and to be slidable over the shaft 20, which holds the intermediate gear 19. The intermediate gear 19 has an intermeshing toothed part 19a formed on its outer circumferential side and in mesh with both the output gear 16 and the intermeshing toothed part 11a of the operation ring 11.

With the power transmission mechanism arranged in this manner, when the camera operator operates some of operation switches provided at the drive unit 2, a rotating force generated at the electric motor 10 is transmitted to the operation ring 11 through the output gear 16 of the variable speed gear 12 and the intermediate gear 19. As a result, the lens unit interlinked with the operation ring 11 is driven by the electric motor 10.

FIG. 7 shows an arrangement for manually driving the operation ring 11. In this case, a clutch plate 21 is caused to rotate by a clutch lever (not shown) when the clutch lever is operated by the camera operator. The clutch plate 21 is provided with a change-over pin 22, which is engaging the intermediate gear 19 as shown in FIG. 6. The intermediate gear 19 slides to the left over the shaft 20 accordingly as the clutch lever is operated. As a result, the intermediate gear 19 comes away from its position of intermeshing with the output gear 16. With the power transmission path between the driving motor 10 and the operation ring 11 cut off by operating the clutch lever in this manner, the lens unit can be manually driven either by operating the operation ring 11 directly by hand or by operating a lever which is provided on the operation ring.

For selective switching between the two modes of driving the lens unit, i.e., the electric motor driving mode and the manual driving mode, the position of the intermediate gear 19 which is located between the output gear 16 and the operation ring 11 to intermesh with both of them is shifted to bring the intermeshing toothed part 19a into an engaging position or into a disengaging position. The intermeshing toothed part 19a is generally formed, like a spur gear, on the outer circumferential side of the intermediate gear 19.

Further, the power transmission member which transmits power by intermeshing of gears and the torque limiter member which prevents toothed faces from being damaged by limiting a transmitting torque in the event of rotation under an overload condition are arranged respectively as discrete members within the power transmission mechanism which links the electric motor 10 with the operation ring 11.

With an optical apparatus having the conventional power transmission mechanism arranged in the above-stated manner, in electrically driving some lens unit included in a photo-taking lens, the intermediate gear 19 which is disposed between the output gear 16 of the electric motor 10 and the operation ring 11 intermeshes with both of two gears, i.e., with the output gear 16 of the motor 10 and the intermeshing toothed part 11a of the operation ring 11.

However, since gears generally have backlash at intermeshing parts, the backlash causes a time lag after the commencement of driving the electric motor 10 and before the operation ring 11 follows the electric motor 10. In cases where the operation ring 11 is instantly driven to rotate by driving the motor 10 at a high speed, the time lag presents no serious problem. However, in the event of a slow zooming, fine lens position adjustment or the like, the time lag before the lens unit actually begins to act after a command for driving the lens unit is issued by the camera operator brings about a serious problem. In such a case, it might be impossible to take pictures as desired by the camera operator.

For driving the lens unit, therefore, it is desired to minimize the backlash of the gear train arranged between the electric motor 10 and the operation ring 11. Further, the torque limiter member which limits a torque transmitted in the event of rotation under an overload condition and the power transmission member which transmits power by intermeshing of gears are arranged as discrete members around the lens barrel independently of each other. Therefore, the arrangement increases the number of necessary parts, which occupy a large space within the drive unit and make the structural arrangement of the drive unit complex to hinder reduction in size and cost.

Further, as technical art related to the invention, there is U.S. patent application Ser. No. 08/745,842 filed Nov. 12, 1996.

BRIEF SUMMARY OF THE INVENTION

It is an object of the invention to provide an optical apparatus wherein a power transmission mechanism which is provided for driving optical means held within a casing either by manually driving an operation ring or by transmitting a rotating force of an electric motor to the optical means is arranged to minimize a time lag before actuation of the optical means by appositely arranging the power transmission mechanism to lessen backlash.

It is another object of the invention to provide an optical apparatus wherein the structure of a torque limiter mechanism which limits a transmitting torque in the event of rotation under an overload condition is simply arranged to permit reduction in size and cost of the apparatus as a whole.

To attain the above objects, in accordance with an aspect of the invention, there is provided an optical apparatus, which comprises an optical unit, manual operation means for manually driving the optical unit, a driving motor for electrically driving the manual operation means, transmission driving force limiting means for limiting a transmission driving force between the manual operation means and the driving motor, the transmission driving force limiting means being formed in a ring shape substantially cocentric with an optical axis of the optical unit, speed reduction means for transmitting a driving force from the driving motor to the transmission driving force limiting means, wherein the following condition is satisfied:

TL<TF<TM where TL is a torque required for driving the manual operation means, which is disposed on the side of the optical unit relative to the transmission driving force limiting means, and the optical unit, TF is a limit torque transmissible by the transmission driving force limiting means, and TM is a limit torque with which a driving system composed of the driving motor and the speed reduction means can be kept stopped against driving from an output side of the driving system.

Further, the transmission driving force limiting means comprises a magnetic force generating member and a magnetic substance, one of the magnetic force generating member and the magnetic substance being connected to the manual operation means and the other thereof being connected to the speed reduction means, and the magnetic force generating member and the magnetic substance is coupled to each other by magnetic attraction.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
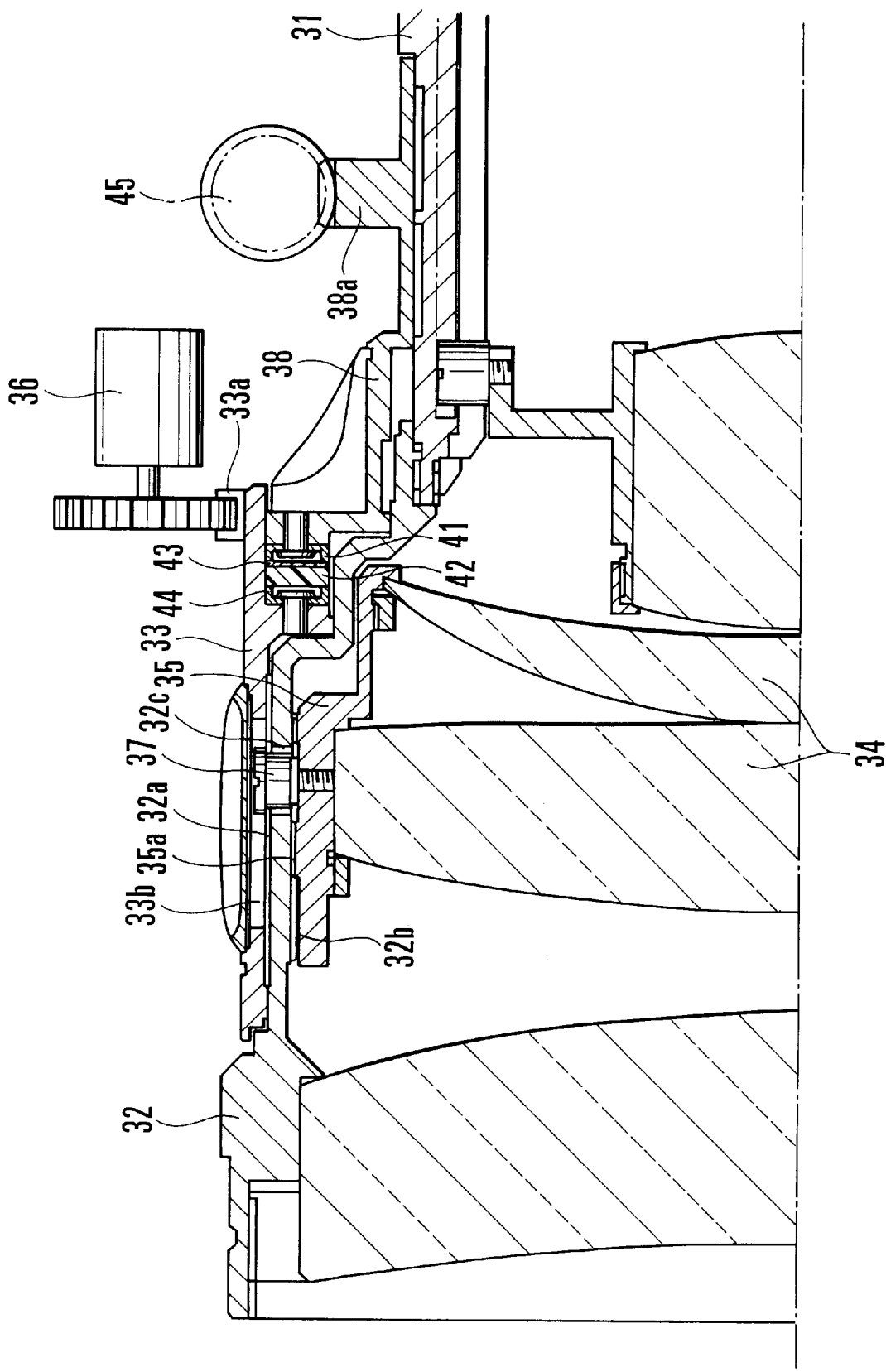
FIG. 1 is a sectional view showing essential parts of a lens barrel which is an optical apparatus according to a first embodiment of the invention.

FIG. 1 is a sectional view showing essential parts of a lens barrel which is an optical apparatus according to a first embodiment of the invention. Referring to FIG. 1, a focusing part of the lens barrel is provided with a transmission driving force limiting means which is a magnetic clutch, a worm gear, and a DC motor. A base tube 32 is connected to a fixed lens base 31 with screws. On the outer circumferential side of the base tube 32, there is provided a helicoid screw 32a, which is helicoid-coupled with a focusing operation ring 33 provided for a manual driving operation. On the inner circumferential side of the base tube 32, there is fitted a focusing tube 35, which holds a focusing lens 34, through helicoid screws 32b and 35a.

The focusing operation ring 33 serving as a part of manual operation means has a fitting engagement part which is fitted on the base tube 32, and is arranged to be rotatable around an optical axis. The camera operator is allowed to perform a manual operation through the focusing operation ring 33. The focusing operation ring 33 is coupled with a position sensor 36, which is composed of an encoder or a potentiometer, through a gear 33a provided on the focusing operation ring 33.

A connection pin 37 provided for transmitting a rotating force of the focusing operation ring 33 to the focusing tube 35 is mounted on the focusing tube 35. The connection pin 37 is inserted into a rectilinear slot 33b formed in the operation ring 33 and a cam slot 32c formed in the base tube 32. The focusing tube 35 can be smoothly moved in the direction of the optical axis through the helicoid screws 32b and 35a according to the rotation of the operation ring 33 caused by a manual operation or a motor driving operation.

An output tube 38 which fittingly engages the lens base 31 and the base tube 32 is arranged to support part of the transmission driving force limiting means and to be rotatable relative to the lens base 31 and the base tube 32. The output tube 38 is provided with a worm wheel 38a. The transmission driving force limiting means is composed of a magnetic substance 41, a plastic magnet 42, a spacer 43 and a yoke plate 44. The magnetic substance 41 is attached to the output tube 38 with screws. The magnetic substance 41 is made of a thin plate of, for example, a semi-rigid permanent magnet of an Fe—Cr—Co system, measuring about 0.5 mm in thickness. The plastic magnet 42 is opposed to the magnetic substance 41 and is attached to the operation ring 33 with screws. The plastic magnet 42 is made of a thin plate of a ferrite system and a nylon base, measuring about 1.5 mm in thickness. Accordingly, attractive force is acting between the magnetic substance 41 and the plastic magnet 42.

The spacer 43 which is made of a material of a nylon base is bonded to one side of the plastic magnet 42 facing the magnetic substance 41. The spacer 43 is formed with a thin plate measuring about 0.1 mm in thickness. The spacer 43 is arranged to keep a space between the magnetic substance 41 and the plastic magnet 42 constant, to generate a friction torque and to define a hysteresis torque. The focusing operation ring 33 has the yoke plate 44 attached by screws thereto together with the plastic magnet 42. The yoke plate 44 is formed with a thin plate made of a SECC-C20 material (a galvanized steel sheet, zinc coated), measuring about 0.5 mm in thickness, and is used for forming a magnetic circuit.

Each of the magnetic substance 41, the plastic magnet 42, the spacer 43 and the yoke plate 44 is in a ring shape extending in the circumferential direction of the lens barrel, and is arranged on the outer circumferential side of the base tube 32 around the optical axis. This arrangement permits effective use of space for reduction in size of the apparatus as a whole. All parts of the system of the transmission driving force limiting means are directly connected to each other without gears or the like, so that any instability and time lag that otherwise take place from backlash are effectively precluded by the arrangement.

Figure 2:
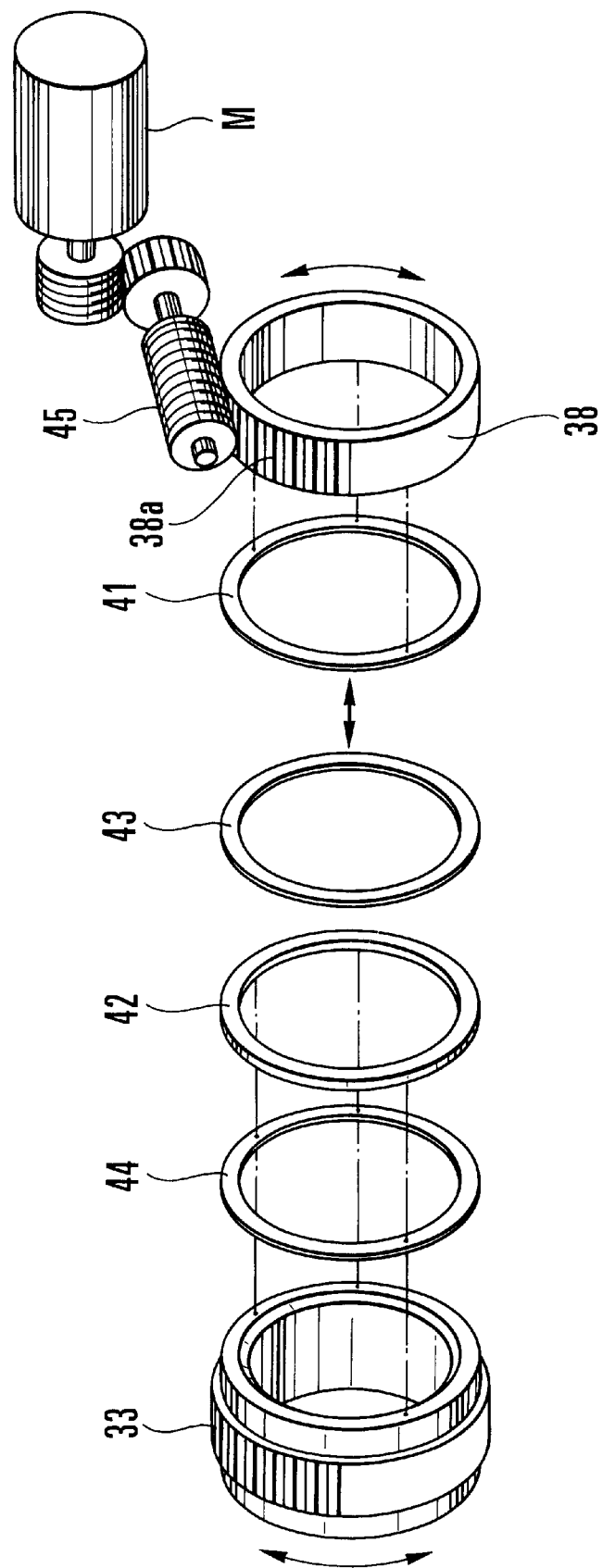
FIG. 2 is an exploded perspective view schematically showing essential parts of the lens barrel shown in FIG. 1.

FIG. 2 is an exploded perspective view schematically showing essential parts of the lens barrel shown in FIG. 1. It is to be noted that FIG. 2 shows the operating principle of the magnetic coupling method, and, therefore, the details of arrangement of the operation ring 33 and the worm wheel 38a are illustrated not exactly in the same manner as in FIG. 1.

The transmission driving force limiting means is provided for transmitting a driving force from a worm 45 mounted on the driving means which includes an electric motor to the operation ring 33 through the worm wheel 38a and the output tube 38. Further, the transmission driving force limiting means is arranged to make a slip between the magnetic substance 41 and the spacer 43 for a load torque larger than a predetermined load torque. A predetermined hysteresis torque can be generated by adjusting a distance between the magnetic substance 41 and the plastic magnet 42. However, the hysteresis torque is determined by the number of polarization and the magnetizing intensity of the plastic magnet 42 or the thickness of the spacer 41. Further, a friction torque is arranged to be generated between the magnetic substance 41 and the spacer 43 according to a necessary torque, so that this friction torque can be used in addition to the hysteresis torque.

In the first embodiment, the transmission driving force limiting means is arranged to have the magnetic substance 41 mounted on the output tube 38, to have the plastic magnet 42 and the yoke plate 44 mounted on the operation ring 33 and to have the spacer 43 mounted on the plastic magnet 42. However, this arrangement may be changed to reverse the mounting relations.

Further, the manual operating feeling on the operation ring 33 can be improved by applying some viscous liquid such as grease to a sliding contact parts of the magnetic substance 41 and the spacer 43. In such a case, although in the first embodiment the transmission driving force limiting means is arranged to make a slip between the magnetic substance 41 and the spacer 43 according to the conditions of operation, the arrangement may be changed. For example, in the event of a manual operation, the torque acts either singly or in a complex manner according to the environmental conditions such as a low temperature or an operating condition such as a high speed rotation. As a result, the slip torque might increase to apply a rotation force to the worm gear, etc., to cause some noisy sound or some damage. Therefore, it is preferable to control and adjust a slip torque by adjusting the magnetizing condition of the plastic magnet 42, etc., and to bring about a slip at a predetermined torque between the plastic magnet 42 and the yoke plate 44 in the event of an abnormal condition.

In driving the operation ring 33 by electric driving means, an output from the electric motor which is a drive source and the worm 45 is transmitted to the operation ring 33 through the worm wheel 38a, the output tube 38 and the transmission driving force limiting means. The rotation of the operation ring 33 is then transmitted to the focusing tube 35 through the connection pin 37 which pierces through the rectilinear slot 33b and the cam slot 32c. As a result, the focusing tube 35 is moved in the direction of the optical axis by the helicoid screws 32b and 35a in such a way as to adjust focus.

In the case of manual driving, when the operation ring 33 is rotated, a driving force which is transmitted from the operation ring 33 to the electric driving means is limited by the slipping of the spacer 43 relative to the magnetic substance 41. A worm gear which is composed of the worm 45 and the worm wheel 38a is arranged to be incapable of backward driving. Therefore, the spacer 43 which is attached to the plastic magnet 42 makes a slip relative to the magnetic substance 41, thereby giving a good operation feeling to the focusing operation.

In a case where some force is applied from outside to the operation ring 33 while the electric driving is in process, no irrational force is applied to the mechanism, because the transmission driving force limiting means does not transmit any load torque exceeding a predetermined load torque. The arrangement of the first embodiment thus obviates the necessity of any mechanism for switching between the mode of electric driving and the mode of manual driving. The focusing lens 34 thus can be driven selectively, by a simple mechanism, either in the manual operation mode or in the electric operation mode.

With a maximum torque required for driving the manual operation means assumed to be TL and a maximum torque transmissible by the transmission driving force limiting means assumed to be TF, each of elements of the first embodiment is set to satisfy a condition of "TL<TF". In addition, the worm gear which is composed of the worm 45 and the worm wheel 38a is arranged to be not rotatable from on the side of the worm wheel 38a. That arrangement enables the mode of manual driving and the mode of electric motor driving to be switched from one over to the other without recourse to any special selecting operation. Further, in the case of a manual operation, the operation ring 33 is rotated with an operation torque of "TL+TF".

As described above, according to the arrangement of the first embodiment, the rotating torque of the motor driving means can be reliably transmitted to the driven side in electrically driving the operation ring 33. In manually driving the operation ring 33, with a mechanism such as the worm gear arranged to be incapable of backward driving, the operation torque of the operation ring 33 is determined by a hysteresis torque generated by the transmission driving force limiting means, the rotation torque of friction and the actuation torque of the focusing lens 34 which results from the motion of the focusing lens 34.

The arrangement thus not only gives a stable rotation torque of the transmission driving force limiting means but also gives a desired rotation torque with the plate thickness of the spacer 43 adjusted. Further, the electric motor driving means can be protected against an overload and reverse driving taking place on the driven side. The structure of the transmission driving force limiting means is extremely simple and does not require much space. Therefore, the transmission driving force limiting means can be disposed close to the operation ring 33 and thus contributes to reduction in size and cost of the apparatus. Further, the use of the worm gear not only permits more effective utilization of space than use of a gear train but also ensures excellent response by minimizing an adverse effect of backlash.

In the first embodiment described above, the worm gear is used for preventing reverse rotation. The worm gear may be replaced, for example, with some speed reducer that is arranged to eventually have a large and limited reverse rotation torque. Such a speed reducer may be selected from among speed reducers including a speed reducer having a large reduction ratio with a planet gear, a spur gear, etc., arranged in a multiple stage, a speed reducer having either no backlash or a minimal backlash with gears arranged to have urging forces on each other, a speed reducer having a differential mechanism.

Also, in this case, each of elements of the first embodiment is set to satisfy the following condition:

TL<TF<TM where TL is a torque required for driving the manual operation means, which is disposed on the side of the focusing lens 34 relative to the transmission driving force limiting means, and the focusing lens 34, TF is a limit torque transmissible by the transmission driving force limiting means, and TM is a limit torque with which a driving system composed of the driving motor and the speed reduction means can be kept stopped against driving from an output side of the driving system. Accordingly, switching between the manual operation and the motor driving can be performed without recourse to any specific switching operation.

Further, in a case where the torque TL varies due to the variation of the environment condition, the rotating speed of the manual operation means, or the like, and the limit torque TF and the limit torque TM vary due to the variation of the environment condition, it is necessary to set each of elements of the first embodiment so as to satisfy the above inequalities over a predetermined range of the variation of such condition.

While the first embodiment has been described in respect of the arrangement for driving a focusing lens, the arrangement applies also to a driving action for a zooming lens, as in the case of a second embodiment described below.

Figure 3:
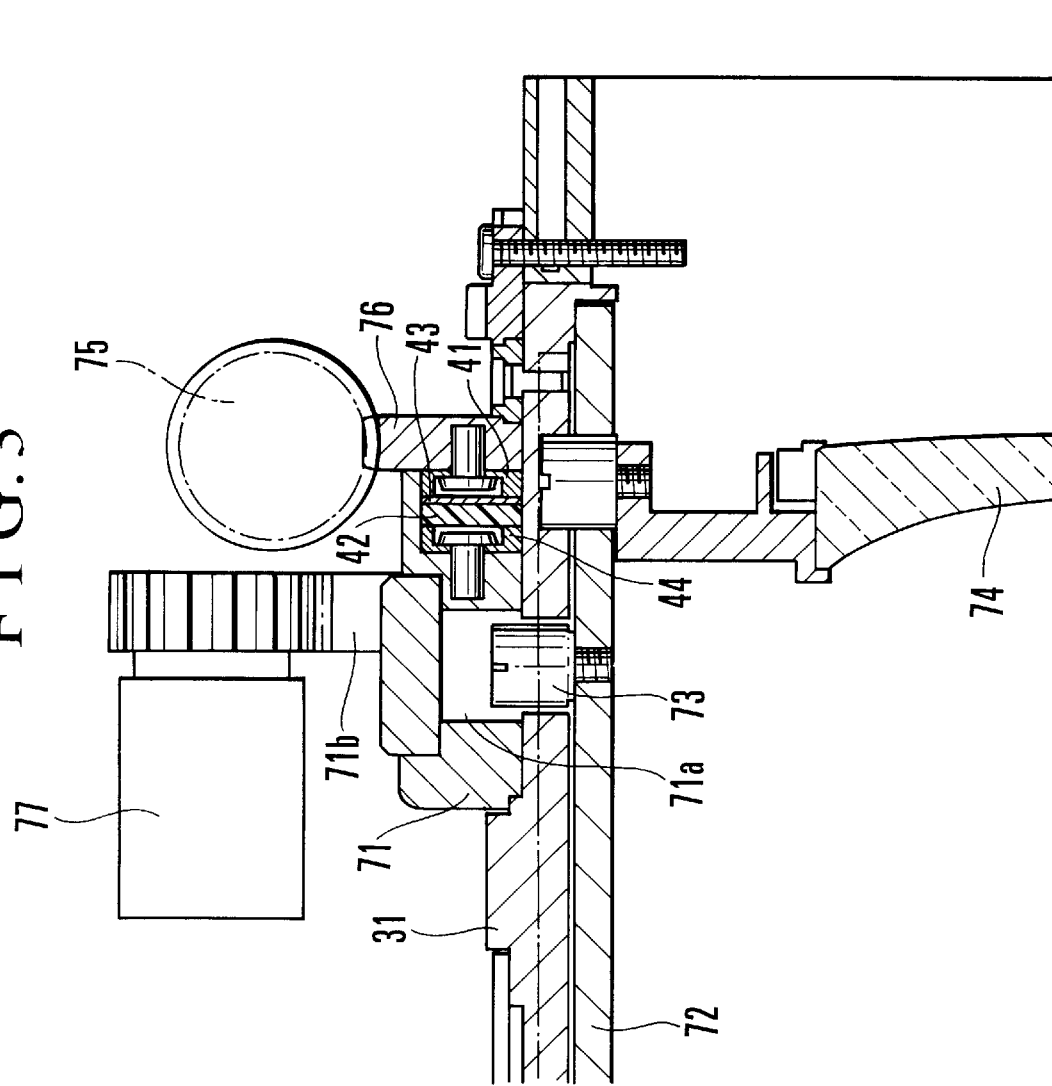
FIG. 3 is a sectional view showing essential parts of a lens barrel which is an optical apparatus according to a second embodiment of the invention.
Figure 4:
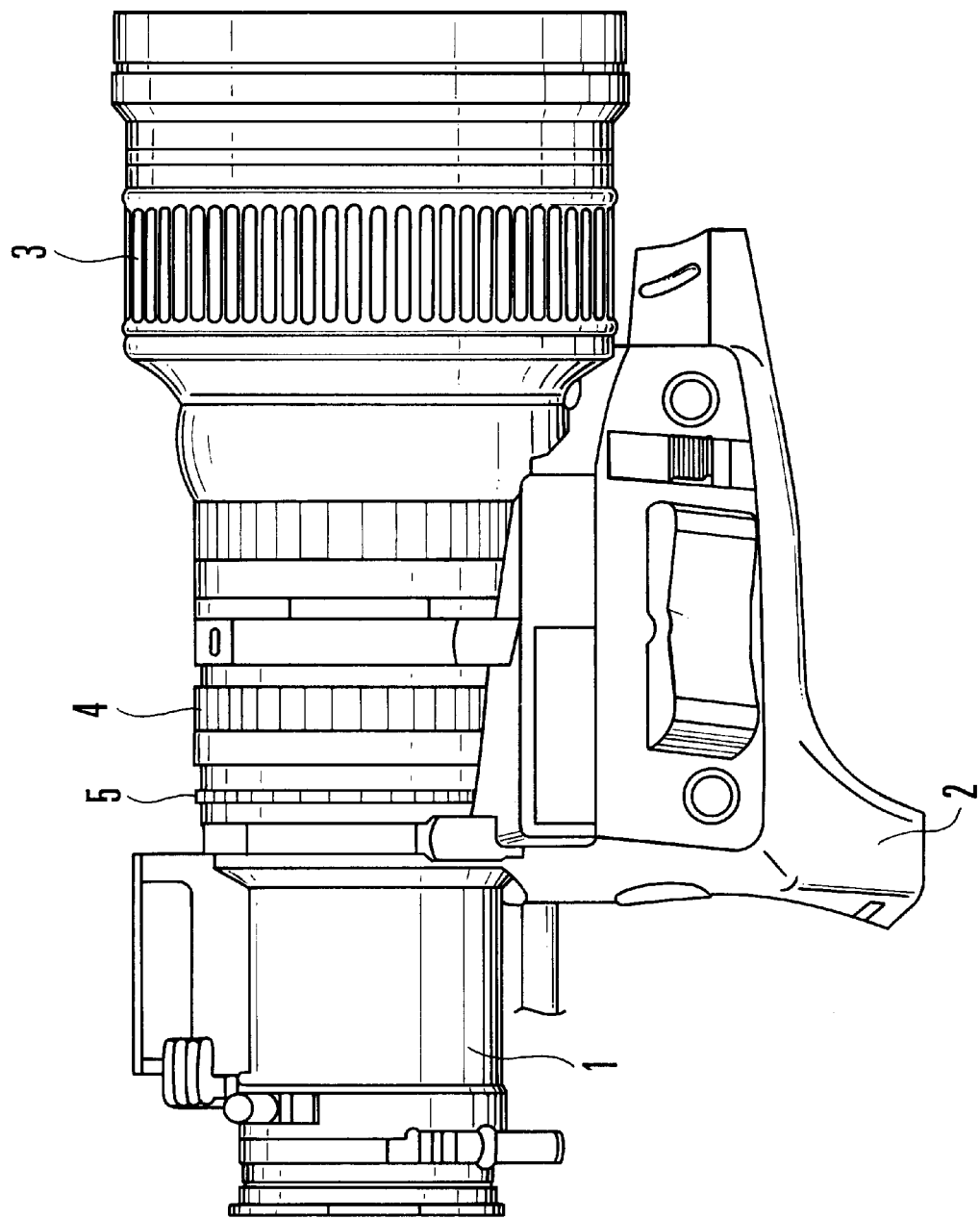
FIG. 4 shows the appearance of the conventional photo-taking lens.
Figure 5:
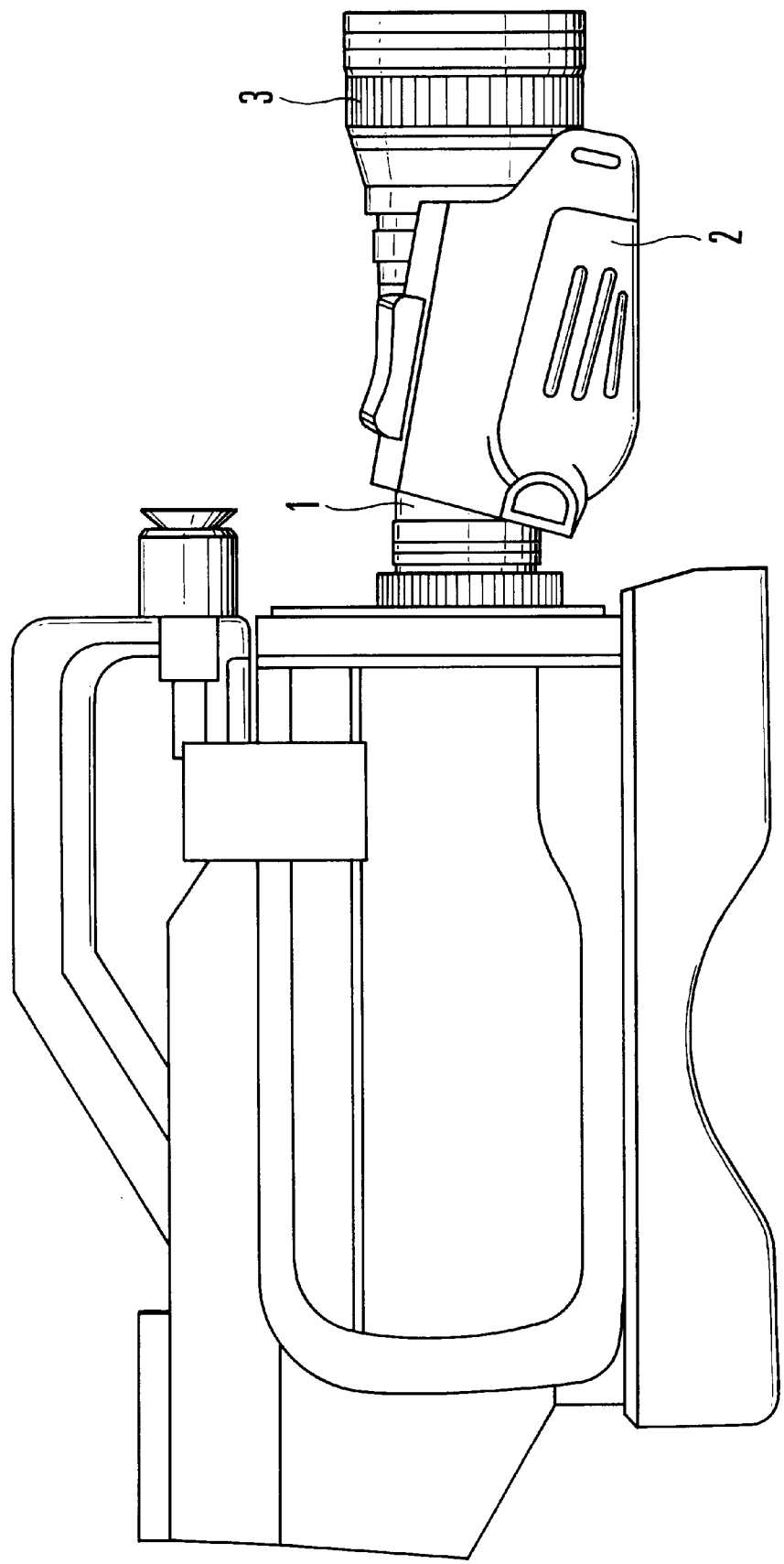
FIG. 5 shows the appearance of a video camera on which the conventional photo-taking lens is mounted.
Figure 6:
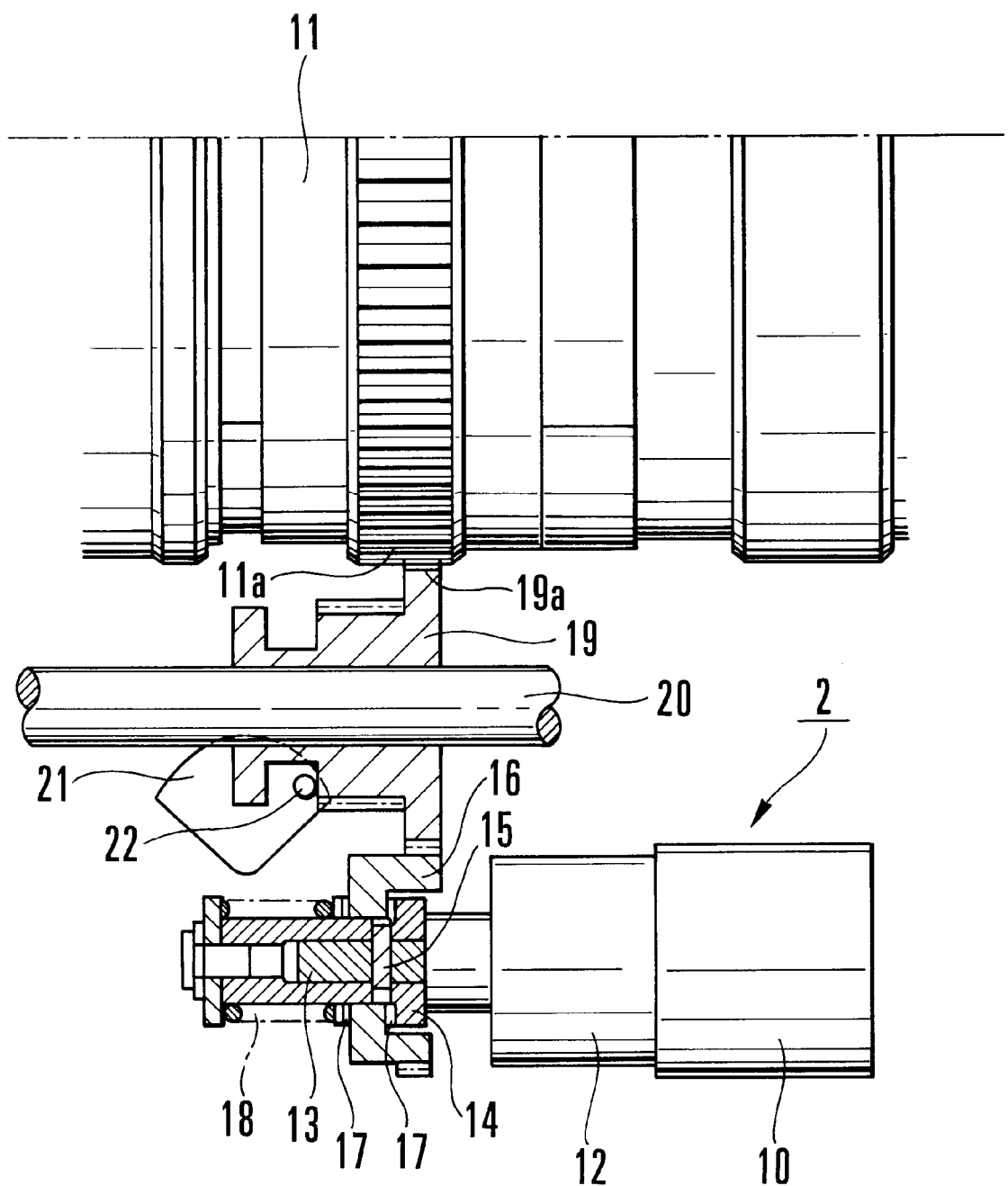
FIG. 6 shows the arrangement of essential parts of a lens barrel of the conventional photo-taking lens.
Figure 7:
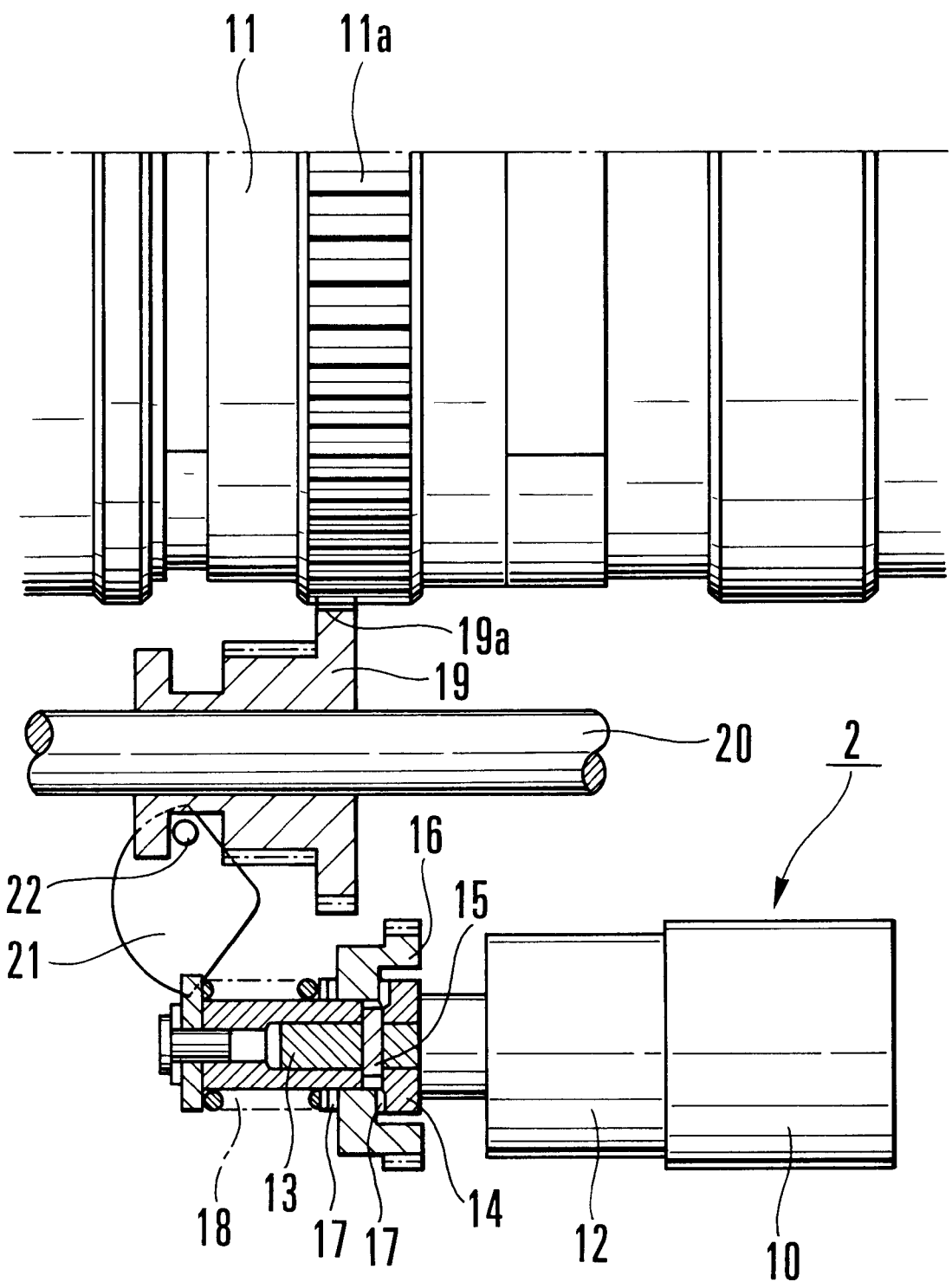
FIG. 7 shows the arrangement of essential parts of the lens barrel of the conventional photo-taking lens.

FIG. 3 shows in a sectional view essential parts of a lens barrel which is an optical apparatus according to the second embodiment of the invention. In FIG. 3, the parts and members of the second embodiment arranged in the same manner as those of the first embodiment are indicated by the same reference numerals as those used in FIG. 1.

Referring to FIG. 3, a zoom part of the lens barrel is provided with a transmission driving force limiting means serving as a magnetic clutch, a worm gear and a DC motor. A zooming operation ring 71 which is provided for a manual operation is disposed on the outer circumferential side of a fixed lens base 31. The operation ring 71 has a fitting engagement part arranged on the lens base 31 and is rotatable relative to the fixed lens base 31.

A direct connection pin 73 is provided for transmitting the rotating force of the operation ring 71 to a cam ring 72. The direct connection pin 73 is mounted on the cam ring 72 and is fitted into a cam slot 71a provided in the operation ring 71. The cam ring 72 is arranged to smoothly move a lens unit 74 composed of a variator lens part and a compensator lens part in the direction of an optical axis according to the rotation of the operation ring 72 caused by a manual operation or an electric motor driving operation. The DC motor serving as a drive source is interlinked, through the worm gear composed of a worm 75 and a worm wheel 76, with the transmission driving force limiting means which is similar to that of the first embodiment. The transmission driving force limiting means is disposed between the worm wheel 76 and the operation ring 71 and is arranged to make a slip for a load torque larger than a predetermined load torque, as in the case of the first embodiment. A position sensor 77 is linked with the operation ring 71 through a gear 71b.

With the second embodiment arranged as mentioned above, in driving the operation ring 71 by electric motor driving means, an output from the DC motor serving as drive source and the worm 75 is transmitted, as a rotating force of the worm wheel 76, to the operation ring 71 through the transmission driving force limiting means. The rotation of the rotation ring 71 is transmitted to the cam ring 72 through the connection pin 73. As a result, the lens unit 74 which has an engaging member arranged to engage a rectilinear cam provided in the lens base 31 and a curved cam provided in the cam ring 72 is moved in the direction of the optical axis to adjust and vary magnification.

In the mode of manual driving, when the operation ring 71 is rotated, a slip takes place relative to the magnetic substance at the transmission driving force limiting means, because the transmission mechanism using the worm gear is arranged to be incapable of backward driving. Then, in the same manner as in the mode of electric motor driving, the lens unit 74 is driven for zooming adjustment according to the rotation of the operation ring 71. In a case where a force is exerted on the operation ring 71 from outside while the electric motor driving mode is in process, the transmission driving force limiting means also makes a slip if a torque resulting from the external force comes to exceed the predetermined torque. The mechanism of the lens barrel, therefore, never receives any irrational force. The second embodiment is thus arranged to be capable of selectively driving the lens unit 74 either in the manual driving mode or in the electric motor driving mode without necessitating any mechanism for switching between the two driving modes, so that the mechanism of the second embodiment can be simply arranged.

According to the arrangement of the second embodiment described above, the rotation torque of the driving means can be reliably transmitted to the driven side in the mode of electrically driving the operation ring 71. In the manual driving mode, the use of the worm gear, etc., arranged to be incapable of backward driving, for example, as a means for transmitting the rotation torque of the electric motor driving means, effectively allows the manual operation torque of the operation ring 71 to be determined by the rotation torque generated by the transmission driving force limiting means and the actuating torque resulting from the lens moving motion of the lens unit 74.

As described above, for an optical apparatus arranged according to the invention to drive an optical means held within the apparatus either by manually driving an operation ring or by a power transmission mechanism arranged to transmit a rotating force of an electric motor to the optical means, the arrangement according to the invention obviates the necessity of switching between the manual operating mode and the electric motor operating mode, reduces backlash, lessens a time lag before lens actuation, and simplifies the structural arrangement of the torque limiter mechanism which limits a transmitting torque in the event of overload rotation, so that the apparatus as a whole can be simply and compactly arranged.

We claim:

1. An optical apparatus comprising:

an optical unit;

manual operation means for manually driving said optical unit;

a driving motor for electrically driving said manual operation means;

transmission driving force limiting means for limiting a transmission driving force between said manual operation means and said driving motor, said transmission driving force limiting means being formed in a ring shape substantially cocentric with an optical axis of said optical unit;

speed reduction means for transmitting a driving force from said driving motor to said transmission driving force limiting means, wherein the following condition is satisfied:

$TL<TF<TM$ where TL is a torque required for driving said manual operation means, which is disposed on the side of said optical unit relative to said transmission driving force limiting means, and said optical unit, TF is a limit torque transmissible by said transmission driving force limiting means, and TM is a limit torque with which a driving system composed of said driving motor and said speed reduction means can be kept stopped against driving from an output side of said driving system.

2. An optical apparatus according to claim 1, wherein said transmission driving force limiting means comprises a magnetic force generating member and a magnetic substance, one of said magnetic force generating member and said magnetic substance being connected to said manual operation means and the other thereof being connected to said speed reduction means, and wherein said magnetic force generating member and said magnetic substance is coupled to each other by magnetic attraction.

3. An optical apparatus according to claim 2, wherein said transmission driving force limiting means further includes a spacer between said magnetic force generating member and said magnetic substance.

4. An optical apparatus according to claim 2 or 3, wherein said transmission driving force limiting means further includes a viscous fluid between said magnetic force generating member and said magnetic substance.

5. An optical apparatus according to claim 1, wherein said speed reduction means is a worm gear composed of a worm arranged to be driven by said driving motor and a worm wheel engaging said worm and connected to part of said transmission driving force limiting means on the side of said driving motor.

6. An optical apparatus according to claim 1, wherein said optical unit is a focusing lens.

7. An optical apparatus according to claim 1, wherein said optical unit is a zooming lens.

* * * * *

UNITED STATES PATENT AND TRADEMARK OFFICE
CERTIFICATE OF CORRECTION

PATENT NO.    : 5,959,786
DATED         : September 28, 1999
INVENTOR(S)   : Yamamoto et al.

It is certified that error appears in the above-identified patent and that said Letters Patent is hereby corrected as shown below:

Title page, Item [57], delete "cocentric" and insert --concentric--.

Col. 3, line 43, delete "cocentric" and insert --concentric--.
Col. 3, line 64, delete "is" and insert --are--.
Col. 5, line 44, after "motor" insert --M--.
Col. 6, line 41, delete "irrational" and insert --excessive--.
Col. 8, line 47, delete "irrational" and insert --excessive--.
Col. 9, line 24, delete "cocentric" and insert --concentric--.

Signed and Sealed this

Tenth Day of April, 2001

Attest:

NICHOLAS P. GODICI

*Attesting Officer*   *Acting Director of the United States Patent and Trademark Office*